June 18, 1968  J. PESCHON  3,389,243
DYNAMIC OPTIMIZER
Filed June 15, 1964  2 Sheets-Sheet 1

INVENTOR.
JOHN PESCHON
BY Samuel Lindenberg
ATTORNEY

United States Patent Office 3,389,243
Patented June 18, 1968

3,389,243
DYNAMIC OPTIMIZER
John Peschon, Los Altos, Calif., assignor to Stanford Research Institute, Menlo Park, Calif., a corporation of California
Filed June 15, 1964, Ser. No. 375,099
5 Claims. (Cl. 235—150.1)

ABSTRACT OF THE DISCLOSURE

An analogue computer provides the optimal control of a process from information as to the present state of the process and as to the desired terminal state. It does this by solving, over the predetermined increments required to proceed from the present to the desired terminal state, an equation which represents optimal conditions for proceeding from the present to the desired terminal state. From the information provided by the computer and from the information as to the present state of the control process, a rate control signal is calculated which is applied to the controlled process for operating it in a mode responsive to said rate control signal.

---

This invention relates to electronic control systems and more particularly to improvements therein.

The control of chemical, navigational, and other processes so as to cause them to follow an optimal path is a pervasive requirement in control system technology. In many cases, the particular path which is optimal depends on the present state of the system, which may be continuously changing, and a computing device which continuously indicates the optimal path, considering the state of the system at the present time, would be highly desirable in controlling a system. For example, assume it is desirable to control a jet airplane so that it climbs from take-off to a predetermined altitude such as 30,000 feet with minimum fuel consumption. The optimum climbing rate continuously varies as fuel is consumed and the airplane becomes lighter. A computing device which continuously determines the optimum climbing rate in light of the actual weight of the airplane and the desired gain in altitude at each instant would be of great value in attaining the optimal trajectory.

Digital and analog computing devices are known which can determine the optimal path of a process on the basis of its present state and the desired objective. However, in many situations, the known devices are either very complicated and expensive or else cannot rapidly enough adapt to the changing state of the system. This invention provides a relatively simple computing device which continuously yields optimal control signals for rapidly changing systems.

Accordingly, one object of the present invention is to provide a relatively simple control system for determining the optimal path of a process.

Another object is to provide an analog computing device for continuously providing process control signals defining the optimal path from the existing state of a system to a predetermined desired state.

Still another object is to provide a relatively simple computer arrangement for determining the present optimal rate of change of a certain system variable for a system whose optimal path is defined by a differential equation, and wherein only the present and final values of that variable are known.

These and other objects of the invention may be achieved in an arrangement of computing elements which solves a series of difference equations, derived from the general equation of the optimal path for a system, each of the difference equations relating adjacent points on the optimal path. The present and final states of the system are known points on the optimal path and they are used in the series of difference equations to obtain the other points. For example, the equation $y=e^x$ may be approximately defined by a difference equation relating any three points $y_1$, $y_2$, and $y_3$ equally spaced along the $x$ axis by an amount $d$, the difference equations being as follows:

$$y_3 = y_2(2+d^2) - y_1$$

In the invention, the present state of the system is used to obtain one point $y_1$ in the first difference equation in the series. Successive points are obtained from the results of the previous difference equation solutions, each solved by a computer element in a series of similar elements. Finally, the solution of the last difference equation is obtained from the last computer element in the series, and this solution should represent the desired final state of the system. Any difference between the solution of the last difference equation and the predetermined desired state represents an error which is fed to the first computing element in the series to correct all of the following elements and reduce the final error. Thus, each difference equation computing element is continuously conformed to the optimal path. As the present state of the control system varies, the input $y_1$ to the first computing element varies and the signals in all of the other computing elements vary accordingly. The outputs of the computing elements are used to control a process; for example, the difference between $y_3$ and $y_2$ (divided by the distance along the $x$ axis) represents the derivative or rate of change along the optimal path, and the process may be set to proceed at this rate in order that it may follow the optimal path.

In one embodiment of the invention, the input representing the present state of the system is delivered progressively to different computing elements in the series as the controlled process progresses. Thus, as the desired state of the system is approached, the signal representing the present state is delivered to computer elements nearer the last in the series. By this arrangement, the control system can be made simple because each computing element then always represents the same increment of time or other independent variable along the path of the system.

Various features of the invention and a fuller understanding thereof may be gained from the following description and claims taken in conjunction with the accompanying drawings in which:

Figure 1:
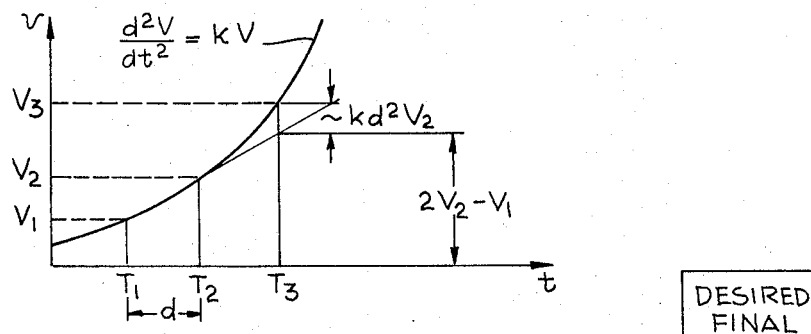
FIGURE 1 is a graph showing a typical optimal system path for a process.

Reference is now made to FIGURE 1 which illustrates a path for a process such as the flight of a jet airplane from the ground to a predetermined altitude. The axis $v$ represents an independent system variable such as the height of the airplane and the axis $t$ represents an independent variable such as time, the values $V_1$, $V_2$, and $V_3$ representing height as times $T_1$, $T_2$, and $T_3$ respectively. The path is the desired path of the system such as that required to reach the desired altitude with a minimum fuel consumption, the path being referred to as the optimal path. Usually only the general equation of this optimal path, the present state of the system and the desired final state are known and it is desired to determine the present rate of change of the system state required to follow the optimal path.

The graph of FIGURE 1 is of the form wherein the second derivative of the path function is equal to a constant multiplied by the function; this is a form of optimal path equation often encountered in actual processes. The derivation of $V_3$ from the values of $V_1$ and $V_2$ by a difference equation is indicated on the graph, and will be explained hereinafter.

Figure 2:
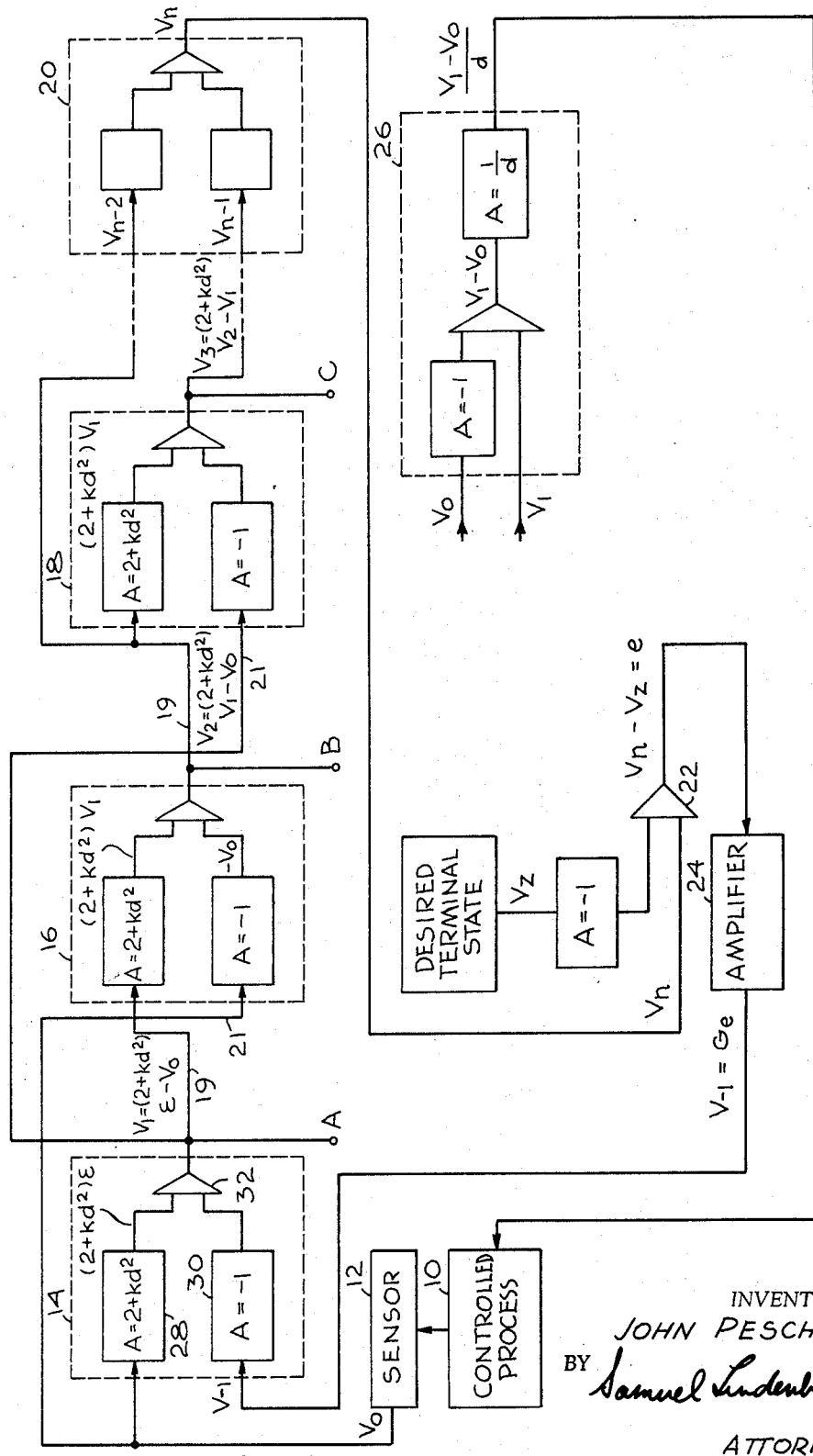
FIGURE 2 is a schematic diagram of a computer capable of solution of a two-point boundary value problem constructed in accordance with this invention.

FIGURE 2 is a schematic diagram of a computer device for determining that rate of change of a controlled system 10 which is required for it to follow an optimal path. The independent system variable to be controlled, such as height, is represented by signals V, the present system state is represented by the signal $V_0$ and the desired final state is represented by a signal $V_z$. A sensor 12 senses the present state of the controlled system 10 and delivers the signal $V_0$ to a first computing element 14 of the device. The computing element 14 yields an output $V_1$ which represents the state of the system after a predetermined increment of time or other independent variable, if it follows the optimal path. The first element 14 is connected to a second computing element 16 which yields an output $V_2$ representing the state of the system if it follows the optimal path from the point $V_1$ during a predetermined increment. A third element 18 is similarly connected to yield an output $V_3$, and a series of additional elements are provided. The last element 20 of the series yields an output $V_n$ which should represent the desired final state of the system if it follows the optimal path. Inasmuch as the outputs of the individual computing devices 14, 16, 18, etc. yield values of the controlled system variable V which lie on the optimal path, the optimal path is completely defined. The required present rate of change of the variable V is obtained by determining the difference between $V_2$ and $V_1$ and dividing this by the predetermined interval of the independent variables such as time. Other characteristics of the system as it follows the optimal path such as the required acceleration or the required rate of change of V at a certain future time, are also easily determinable.

The function of each computing element such as element 14 is to solve a difference equation which is characteristic of all optimal paths of the controlled process. Thus, each of the computing elements 14, 16, 18, etc. essentially solves the equation:

$$V_i = F(V_{i-1}, V_{i-2})$$

where $V_i$, $V_{i-1}$, and $V_{i-2}$ are three adjacent points on the optimal path and F represents a function relating two of the points, $V_{i-1}$ and $V_{i-2}$ to a third point $V_i$. In order to solve each equation for $V_i$, the values of $V_{i-2}$ must be known. For each computer element which obtains the value of $V_i$, $V_{i-1}$ is obtained from the output of the immediately preceding computer element by means of first feeding connectors 19 and $V_{i-2}$ is obtained from the computing element next preceding the preceding element by second feeding connectors 21. Thus, element 18 which yields an output $V_3$, operates on the output $V_2$ of element 16 and the output $V_1$ of element 14. The first and second elements 16 and 18 operate on an input $V_0$ which is the actual present value of V. By utilizing the actual present value of V, the series of computing elements is caused to yield an optimal path which begins at or passes through the actual state of the system.

One of the inputs $V_{-1}$ to the first computer element 14 represents the state of the system prior to the present instant. This input $V_{-1}$ is the difference, amplified, between the desired final state $V_z$ of the system and the calculated final state $V_n$. This difference quantity is obtained by adding the value of the calculated final state $V_n$ to the negative of the desired final state $V_z$, in the operational amplifier 22. The difference $e$ is amplified in the amplifier 24 to obtain the input $V_{-1}$. In this manner, the calculated optimal path is tied to another known point on the actual path of the controlled process, namely the final state $V_z$. If the calculated state $V_n$ is much greater than the desired final state $V_z$, then $V_{-1}$ is a large positive value and the initial rate of change from $V_{-1}$ to $V_0$ on the optimal path is reduced; accordingly, the rate of change of the rest of the calculated path is reduced and the final value $V_n$ is reduced and brought closer to $V_z$. Conversely, if $V_n$ is less than the $V_z$, $V_{-1}$ is negative, the initial slope or rate of change of the calculated optimal path is increased, and $V_n$ increases so that it approaches $V_z$. Generally there must be some difference between $V_n$ and $V_z$ in order to obtain a $V_{-1}$ of sufficient magnitude to yield an accurate optimal path. By providing a high gain amplifier 24 to amplify the difference $e$, the required difference is very small and the calculated values of V along the optimal path are close to the true optimal path.

The computed values of the variable V along the optimal path are obtained from terminals A, B, C, etc. which are connected to the output ports of the computer elements 14, 16, 18, etc. The values of $V_1$, $V_2$, $V_3$, etc. may be used in various applications to control the controlled process 10. One application of importance is in determining the present rate of change of V along the optimal path. Thus, if V represents the height of an airplane at any instant of time, the rate of change of V is the climbing rate which must be obtained. The circuit 26 provides a means for determining the present rate of change of V along the optimal path. The input signal to circuit 26 are obtained from the outputs of the sensor 12 and computer element 14. Information on the optimal present rate of change is delivered to the controlled process 10 to alter the process so that it conforms thereto. For example, the throttle of an airplane may be opened to increase or reduce the airplane's speed.

The manner in which each computer element 14, 16, 18, etc. obtains values of V is by solving a difference equation characteristic of the optimal path of the controlled process. The optimal paths for controlled processes, from the present to a desired final state, are generally defined as the paths which require the least expenditure of some quantity such as energy or time. The expenditure of such a quantity is typically given by the equation of the form.

$$C = \int_{T_1}^{T_2} \left[ kV^2 + \left(\frac{dV}{dt}\right)^2 \right] dt$$

where C is the total expenditure of a quantity such as fuel required to bring the system from the present state to a desired final state, V is a system variable which varies as function of time, $T_1$ represents the present time, $T_2$ represents the time when the final desired state is reached, and $k$ is a positive constant characteristic of the system. Equations of this type are shown derived in an article by Kalman and Koepcke, "Optimal Synthesis of Linear Sampling Control Systems Using Generalized Performances Indexes," ASME Trans. Paper No. 56—IRD—6, 1958, p. 182. In this case, the optimal trajectory of V (for C a minimum) is given by the Euler equation:

$$\frac{d^2 V}{dt^2} = kV$$

subject to the boundary conditions of V at time $T_1$ and V at terminal time. The Euler equation is approximated by the difference equation:

$$V_i = (2 + kd^2) V_{i-1} - V_{i-2}$$

where $V_i$ is the value of the independent system variable V at same time $i$, $V_{i-1}$ is the value of V at a time $i-1$ which is earlier than the time $i$, $V_{i-2}$ is the value of V at a time $i-2$ which is earlier than the time $i-1$, $d$ is the interval of time between $i-1$ and $i-1$ and between $i-1$ and $i-2$, and $k$ is the same constant appearing in the above-stated Euler equation. It is this difference equation which is solved by the computer elements 14, 16, 18, etc. of FIGURE 2.

Each computer element comprises a first amplifier 28 whose gain is $2+kd^2$, where $k$ is the constant characteristic of the process as given in the above Euler and difference equations, and $d$ represents a period of time. The interval of time $d$ is chosen so that $d$ multiplied by the number of computer elements 14, 16, 18, etc. is equal to the time period between the initial state $V_0$ and the final desired state $V_z$. A second amplifier 30 of gain $-1$ is also provided. The outputs of the two amplifiers 28 and 30 are added together by the operational amplifier 32. The graph of FIGURE 1 shows how the difference equation solved by the amplifier 14 derives the value of a third point on an optimal path from two previously known points on the optimal path.

When the computing system of FIGURE 2 is employed to control an operating process, the time interval between the present and final states continuously decreases. Thus, in the circuit of FIGURE 2, the gain of each amplifier 28 must be continuously decreased in accordance with the decrease of $d$, which represents the interval between two points on the optimal path calculated by adjacent computer elements. This may be accomplished by providing an automatically operated rheostat in series with the output of amplifier 28, or other well known means for varying the gain of an amplifier.

The variation of the gain of amplifiers 28 lends additional complications to the computer control. Also, the outputs of the computer elements must continuously change even while the control system is following the optimal path. Thus, the response of each computer element must be rapid in order that the whole series of computer elements will rapidly change and the output of the final element 20 will continuously approximate the desired final result. The circuit of FIGURE 3 allows the use of computer elements of relatively slow response, and eliminates the need for constantly changing the amplification of the elements 28 as the times remaining until the final state is reached decreases.

Figure 3:
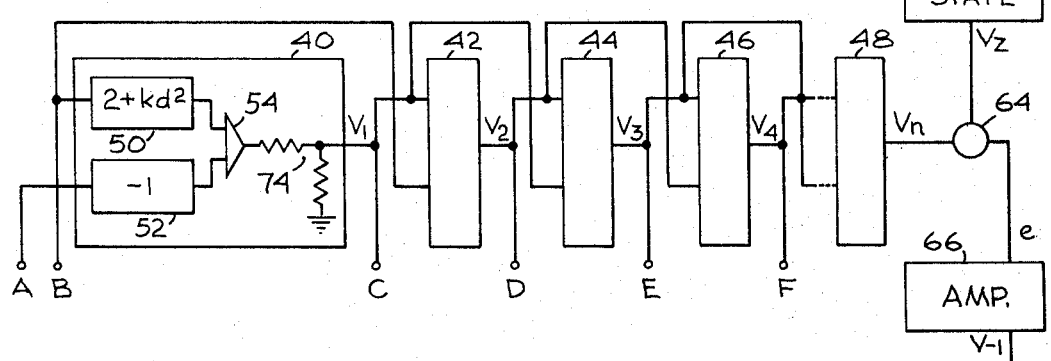
FIGURE 3 is a schematic diagram of an embodiment of a control system for the solution of optimal control problems constructed in accordance with this invention.
Figure 3:
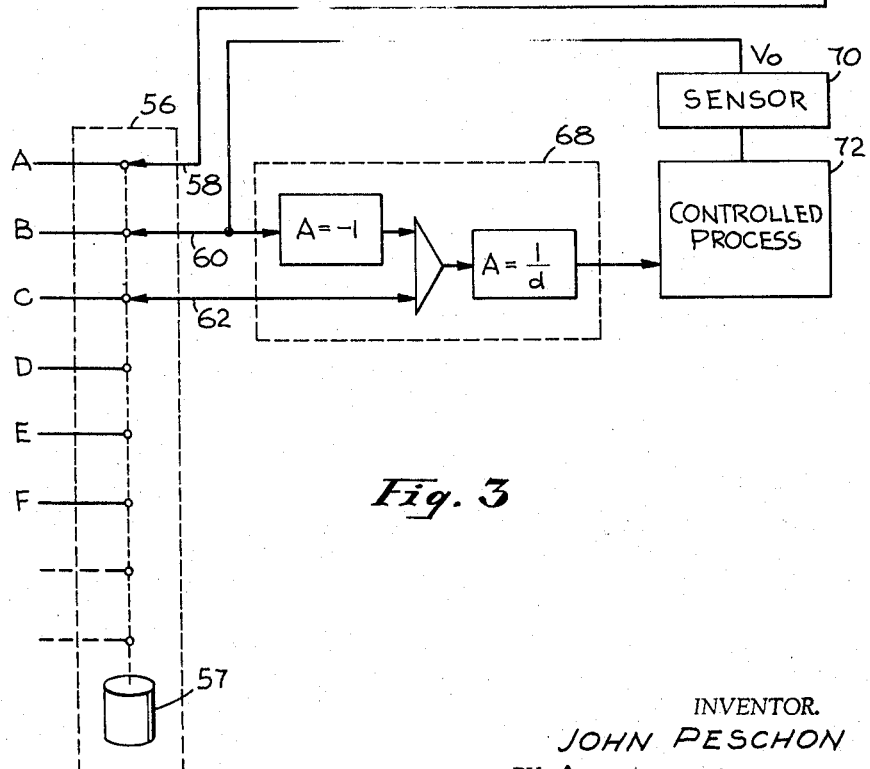

The circuit of FIGURE 3 is similar to the circuit of FIGURE 2 except that the inputs $V_0$ and $V_{-1}$ are not delivered to the first computer element 40 at all times. Instead, $V_0$ and $V_{-1}$ are delivered to different computer elements in the series as the optimal path is followed, so that the time interval $d$ between points $V_1$, $V_2$, $V_3$, etc. is constant. As a result, the amplification of each amplifier 50 may remain constant for a given optimal path and the outputs $V_1$, $V_2$, $V_3$, etc. of the computer elements remain constant during the progress of a process along an optimal path.

In the circuit of FIGURE 3, a series of computer elements 40, 42, 44, 46, etc. is provided to solve difference equations characteristic of the optimal path. Each computer element comprises a first gain element 50, a second gain element 52, and an operational amplifier 54 similar to each computer element of FIGURE 2. The output of the last computer element 48 is compared with the desired value $V_z$ of the final system state in comparer 64 and the difference $e$ is amplified in amplifier 66 to obtain $V_{-1}$, as in FIGURE 2. The two inputs A and B to the first element 40, and one input C, D, E, etc. of each of the other computer elements 42, 44, 46, etc. are connected to a stepping switch 56. Three movable contacts 58, 60, and 62 of the stepping switch are provided, which make contact with the inputs A, B, C, D, E, F, etc. from the computing elements. The three movable contacts 58, 60, and 62 move together. The contact 58 is always at the potential of $V_{-1}$ and thus applies this potential to various computer element inputs as the stepping switch operates. The contact 60 is always at the potential $V_0$ and thus applies this potential to various computer element inputs as the stepping switch 56 operates.

The values of V derived from the computer elements is used to determine the present rate of change of V required to follow the optimal path. The circuit 68, which is similar to the circuit 26 of FIGURE 2, performs the required calculation. The input information delivered to the circuit 68 from contacts 60 and 62 is the value of V at the present and the valve of V at a time later than the present by a period $d$. The value of V at prevent is $V_0$, which is derived from a sensor 70 which senses the present state of the controlled process 72. The value of V from contact 62 is obtained from the output of the same computer element to which $V_0$ is applied as an input. Thus, as the contact 60 is stepped from one computer element to the next in the series, the contact 62 is similarly stepped.

When the computer of FIGURE 3 first begins to calculate the optimal path, the contacts 58, 60, and 62 are connected to the terminals A, B, and C of the computer elements. After a time period $d$, a motor 57 of the stepping switch advances the contacts to connection with the terminals B, C, and D respectively. This process is continued until the final desired state of the controlled process is reached.

When the inputs $V_0$ and $V_{-1}$ are connected to successive computer elements, there may be interference from the preceding computer elements. Thus, when contact 60 is connected to contact C, both $V_0$ and $V_1$ are connected together at the output of computer element 40. Interference from $V_1$ may be eliminated by connecting a resistive network 74 to the output of the operational amplifier 54, so that any inputs $V_0$ or $V_1$ to the next computer element will dominate.

Although the rate of change may be required in some applications, the derivative of the rate of change may be desired. Thus, if V represents the height of an airplane which is to reach a predetermined final height in a given time period with a minimum fuel consumption, it may be desired to determine the required vertical acceleration at any instant, inasmuch as the setting of the engine throttle is generally closely related to the required vertical acceleration. Vertical acceleration may be derived from the computer elements of FIGURES 2 and 3 by noting the value of V at three adjacent points, instead of two, from which the approximate acceleration may easily be calculated.

The particular dynamic optimizing circuits described have included operational amplifiers, and other electrical apparatus. It is apparent, however, that other computing elements such as those which employ mechanical linkages or pneumatic elements may be used instead.

While particular embodiments of the invention have been described in detail, many variations and modifications may be employed without departing from the spirit and scope of the claims which follow herein.

What is claimed is:

1. A dynamic optimizer for controlling a system whose optimal path is given by equations of the form $$\frac{d^2V}{dt^2} = kV$$

where $t$ is an independent system variable representing time, V is a dependent system variable which is a function of $t$, and $k$ is a constant, comprising:

a plurality of computer elements connected in a series arrangement, each having two input ports and an output port, each of said computer elements including a first amplifier means connected to said first input port which has a gain proportional to $(2+kd^2)$ where $d$ is approximately equal to the time period between the present system state and the desired final system state divided by the number of computer elements in said series arrangement, and operational amplifier means connected to said first amplifier means and said second input port for generating a signal proportional to the difference therebetween;

a plurality of first feeding connectors, each extending between one of said two input ports of a computer element and the output port of the next preceding computer element in said series arrangement;

a plurality of second feeding connectors, each extending between the second of said two input ports of a computer element and the output port of the computer element next preceding the preceding computer element;

sensor means for sensing the present state of said system connected to a first of said computer elements in a group of said series of elements;

signal generating means for generating a signal representative of the desired final state of said system; and means connected to the output of said last of said computer elements in said series arrangement and said signal generating means, for producing a difference signal representative of the difference of its two inputs, means for applying said difference signal to an input port of the first of said series arranged plurality of computer elements, rate means connected to the output of said sensor means and to the output port of that computer element to the input port of which said sensor means output is connected for generating an output representative of an optimal operating rate for said system, and means for applying said output representative of an optimal operating rate to said system for controlling it in a manner to cause the output of said last of said computer elements to correspond closely with said signal representative of the desired final state of said system.

2. A dynamic optimizer for controlling the operation of a system having a known present state to achieve in an optimal manner the transition to a known final state comprising a plurality of computer element means for solving a plurality of difference equations, each said computer element means having a first and a second input port and an output port, means connecting said plurality of computer element means in a series arrangement including a plurality of first connectors, each connecting the first input port of a computer element means with the output port of an immediately preceding computer element means in said series connection, a plurality of second connectors, each of said second connectors connecting the second input port of a computer element means commencing with a third in said series to the first input port of a computer element means immediately preceding said computer element means, sensor means for sensing the present state of said system and producing a sensing signal representative thereof, means for applying said sensing signal to the first input port of a first of said computer element means in said series arrangement, signal generating means for generating a final signal representative of the desired final state of said system, differencing means connected to the output of said last of said computer element means in said series arrangement and to the output of said signal generating means for providing a difference signal representative of the difference of its two inputs, means for applying said difference signal to the second input port of the second computer element means of said series arrangement, rate means responsive to the output of said sensor means and to the output of the same computer element means to the input port of which said sensor means is applied for generating an output signal representative at an optimal operating rate for said system, said rate means having a first and second input port and an output port, means for applying said rate signal to said system for controlling the said system to operate at said optimal operating rate.

3. A dynamic optimizer as recited in claim 2 wherein said means connecting the output of said sensor means to the first input port of said first computer element, said means connecting second input port of said rate means to the output of the computer element means to the input of which said sensor means is connected and said means for applying said difference signal to the second input port of said first of said computer element means in said series all include selector switch means for simultaneously switching the output of said sensor means, the input port of said rate means and said means for applying said difference signal to the similarly designated input and output ports of said successive computer element means.

4. A dynamic optimizer as recited in claim 2 wherein each of said computer element means comprises a first and a second amplifier having as inputs the respective first and second ports, said first amplifier having its gain established at a value determined by $2+kd^2$ where $k$ is a constant characteristic of the process being controlled and $d$ represents an interval of time determined by the interval required for the controlled process to operate from its initial state to its desired terminal state, divided by the number of said computer element means in said series, said second amplifier has a gain of $-1$, and an operational amplifier means for adding the outputs of said first and second amplifiers, said computer element means output port being connected to the output of said operational amplifier means.

5. A dynamic optimizer as recited in claim 2 wherein said rate means includes a first amplifier having a gain of $-1$, said first amplifier having its input connected to said sensor means output, means to which said first amplifier and said first computer element means outputs are applied for providing an output representing their difference, and a second amplifier connected to said last named means, said second amplifier having a gain of $1/d$ where $d$ represents an interval of time determined by the interval required for the controlled process to operate from its initial state to its desired terminal state, divided by the number of said computer element means in said series.

References Cited

UNITED STATES PATENTS

| | | | |
|---|---|---|---|
| 3,033,460 | 5/1962 | March | 235—150.1 |
| 3,048,335 | 8/1962 | Burhans et al. | 235—150.1 |
| 3,070,301 | 12/1962 | Sarnoff | 235—150.1 |
| 3,090,557 | 5/1963 | Levi | 235—150.1 |
| 3,096,471 | 7/1963 | Taylor | 235—150.1 |
| 3,184,686 | 5/1965 | Stanton | 235—150.1 |
| 3,309,507 | 3/1967 | Schlein | 235—150.1 |

MALCOLM A. MORRISON, *Primary Examiner.*

MARTIN P. HARTMAN, *Examiner.*